United States Patent
Murthy et al.

[11] Patent Number: 6,044,356
[45] Date of Patent: Mar. 28, 2000

[54] ASSISTANT FOR RESOURCE AND DEMAND TRADING

[75] Inventors: Seshashayee S. Murthy, Yorktown Heights, N.Y.; Frederick Yung-Fung Wu, Cos Cob, Conn.; James Tien-Cheng Yeh, Katonah, N.Y.

[73] Assignee: International Business Machines Corporation, Armonk, N.Y.

[21] Appl. No.: 09/080,321

[22] Filed: May 15, 1998

[51] Int. Cl.⁷ .................................................. G06F 17/60
[52] U.S. Cl. ............................................... 705/8; 706/61
[58] Field of Search ................. 705/8; 706/13, 706/61

[56] References Cited

U.S. PATENT DOCUMENTS

| | | | |
|---|---|---|---|
| 5,630,070 | 5/1997 | Dietrich | 395/208 |
| 5,787,283 | 7/1998 | Chin | 395/701 |
| 5,878,416 | 3/1999 | Harris | 707/10 |
| 5,884,276 | 3/1999 | Zhu | 705/8 |
| 5,897,629 | 4/1999 | Shinagawa | 706/13 |
| 5,940,816 | 8/1999 | Fuhrer et al. | 706/13 |

*Primary Examiner*—Allen R. MacDonald
*Assistant Examiner*—Anne Teitelbaum
*Attorney, Agent, or Firm*—Whitham, Curtis & Whitham; Stephen C. Kaufman

[57] ABSTRACT

A plurality of near-optimum solutions to allocations of resources to demand information are provided by consideration of different combinations of sources of resource information such as inventory and performance/production capacity of a provider and/or other providers by the use of one or more algorithm/agents and a problem formulator which selects algorithms to be applied and provides selected information from selected sources of resource information thereto. The effects of actions or allocations specified in the solutions are presented to a user for comparison, modification and selection for implementation. Effects of modified solutions are also projected for comparison with other solutions or modified solutions.

18 Claims, 4 Drawing Sheets

| SOLUTION ID | TARDINESS | TONS LATE | ORDERS LATE | PROFIT | MFG. COST | TRANS. COST | QUALITY RISK | PURCHASED INVENTORY |
|---|---|---|---|---|---|---|---|---|
| 1 | 15335 | 3577 | 42 | 102224 | 24335 | 15633 | 6345 | 2434 |
| 4 | 13644 | 2588 | 33 | 84333 | 26778 | 20984 | 5124 | 2134 |
| 12 | 35213 | 7345 | 39 | 115536 | 24233 | 13664 | 4773 | 1123 |
| 15 | 23266 | 4233 | 52 | 124355 | 25355 | 12456 | 7343 | 4233 |
|  |  |  |  |  |  |  |  |  |
|  |  |  |  |  |  |  |  |  |

FIG.3

SOLUTION 4 ACTION DETAILS

| INVENTORY PURCHASES | SUPPLIER | QTY | DATE AVAIL | COST | APPLIED TO ORDER | PRODUCT CODE |
|---|---|---|---|---|---|---|
| VXR − 431 | ARC | 20 | 5 | 3200 | 1532 | 435 |
| VXD − 292 | BSR | 15 | 6 | 2600 | 2215 | 435 |
| ZRV − 113 | SUZ | 30 | 7 | 5400 | 8133 | 441 |

☐ PROJECTION

☐ RE-EVALUATE — 410

☐ SHOW SCHEDULE — 420

FIG.4

| S | M | T | W | T | F | S |
|---|---|---|---|---|---|---|
|  |  |  |  | 1 | 2 | 3 |
|  |  |  |  | 435 | 435 | 435 |
| 4 | 5 | 6 | 7 | 8 | 9 | 10 |
| 435 | 435 | 441 | 441 | 435 | 435 | 435 |
| 11 | 12 | 13 | 14 | 15 | 16 | 17 |
|  |  |  |  |  |  |  |
| 18 | 19 | 20 | 21 | 22 | 23 | 24 |
|  |  |  |  |  |  |  |
| 25 | 26 | 27 | 28 | 29 | 30 | 31 |

FIG.5

ASSISTANT FOR RESOURCE AND DEMAND TRADING

BACKGROUND OF THE INVENTION

1. Field of the Invention

The present invention generally relates to decision support systems for manufacturing or service operations and, more particularly, to decision support systems for providing evaluation and recommendations in regard to allocation of resources relative to demand, especially for commodities, and supporting the trading of capacity, inventory and orders.

2. Description of the Prior Art

Many manufacturers are currently engaged in the manufacture of commodities or materials which are manufactured to order and supplied to customers. Paper, fabrics, structural metal and lumber are but a few examples of such commodities, each of which may comprise different products of different qualities or specifications and which be may made on shared equipment. Other business concerns may provide services which similarly rely on equipment (e.g. trucks for transportation, distribution infrastructure for utilities, power plants for energy and the like) which represents a substantial capital cost. That is, very large, complex and expensive machinery is often utilized for enabling efficient production of a commodity or service having any of a number of combinations of qualities and specifications. Of course, the overall efficiency of the machine, including amortization of its cost and maintenance, will be dependent on how the machine is operated to fill orders from customers.

(While the invention will be described in terms of goods which can be supplied from an inventory of manufactured stock material references to manufacturers should be understood as being inclusive of relatively capital intensive service industries. Accordingly, while the term "production capacity or "manufacturing capacity", these and similar terms should be more generally understood as "performance capacity" which is inclusive of both the capacity to produce goods and capacity to perform or otherwise supply services.)

For example, the paper making industry presents some particularly complex problems. When a commercial grade of paper (e.g. other than specialty papers which are sometimes made manually in individual sheets by traditional processes) is initially made, a large, high-capacity machine is used which has an arbitrarily large web, often twenty feet wide or more, the width of which cannot readily be altered. This machine will be capable of producing paper of that width in a number of grades (e.g. newsprint, bond, etc.), weights, finishes and the like from many different compositions of materials (e.g. wood or cloth fiber and mixtures thereof) but only one set of such specifications can be accommodated at any given time.

Therefore, the production of goods having differing specifications must be scheduled including setup time including the time for making transitional product (e.g. having a mixture of constituent compositions between intended compositions) and the risks of other contingencies when specifications are to be changed. Since set-up time and the time during which transitional product is produced as well as risks of certain contingencies all carry economic costs, efficient use of such a large capacity machine requires that the manufacturing schedules contain as few transitions as possible.

The paper produced by such large-capacity machines will be formed in a wide continuous sheet of approximately the same width as the web. This sheet is wound onto a reel and transported to another large machine where it is unrolled, slit into desired widths and again wound onto rolls of desired dimensions which will be specified in the order. For example, printing presses used for large-circulation newspapers, magazines and the like will have certain maximum capacities for width and diameter of the paper roll and a specification of the diameter of the core (e.g. a cardboard tube on which the paper roll is wound). Paper will be ordered to match these specifications to avoid or minimize printing press down-time when a new roll of paper must be loaded into the press and the number of times the press operation must be halted to do so.

It is known that when the grade, weight, finish, fiber content, etc. of paper being manufactured is changed, a quantity of paper will be produced during the transition which does not meet the specification of any order and can only be sold, if at all, at a much reduced price. If the paper cannot be sold, the material in the paper must be recycled and the production capacity of the machine during the transition period is completely lost along with the wear on the paper-making machine and other economic costs, as alluded to above. The economic cost of this paper, possible recycling and machine wear and amortization must be included in the cost of set-up time to make adjustments to the paper-making machine and during which no marketable paper is produced. It is also recognized in the industry that malfunctions such as tearing of the paper web (which may require several hours of labor by a skilled maintenance crew to correct) become much more likely during such transitions.

In addition, the widths into which the paper must be cut to conform to orders may involve substantial waste when the combination of widths of rolls of a single grade of paper (referred to as the "deckle") corresponding to a combination of existing or anticipated orders for the same grade of paper does not closely match the width of the continuous sheet (which, in turn, matches the width of the web of the machine). Further complications may arise since, for example, the paper slitting apparatus may not concurrently accommodate different core sizes, the production of narrow rolls will increase the number of rolls made from a reel of paper and cause a "bottleneck" in further roll wrapping operations, the acceptance of an order may cause delay in delivery of other orders which may or may not be tolerable to the customers, and the like.

Accordingly, orders for paper which cannot be scheduled with other orders for paper of the same specifications (in order to limit machine transitions) or which do not trim well in combination with other orders (to limit waste) cannot be efficiently manufactured. The manufacturer must therefore determine whether to accept or reject each order based on numerous objective but qualitative criteria such as profitability, customer satisfaction, effect on manufacturing, machine and delivery schedules and the like. However, rejection of an offer or late delivery of an order may have an adverse effect (and in differing degree) on further orders from particular customers. Therefore, some manufacturers maintain some level of inventory to avoid the need to reject orders although others (principally dealing in unique sizes that are difficult to sell) seek to maintain as small an inventory as possible.

While customer orders generally will first be filled from inventory, if possible, the economic costs of maintaining inventory are becoming significant to a degree that inventories of respective manufacturers are usually kept as small as possible. Further, it is desirable from the standpoint of flexibility in filling orders to maintain the product in inventory in a form which can be further processed to the customer's specifications. For example, it would be desirable to maintain paper in the full-width reels rather than cut rolls so that customer specified roll sizes can be accommodated. Therefore, filling orders from inventory does not provide a complete solution to problems of manufacturing efficiency since there is an economic cost to the maintenance of the inventory, itself, and the further processing of inventory to meet order specifications may entail significant levels of waste.

Accordingly, if a manufacturer has insufficient quantity of a product in inventory to fill the order or the rework of inventory product would entail unacceptable waste, it has become customary for the manufacturer to seek to purchase existing product from the inventory of one or more other manufacturers to complete the order rather than incur the setup cost and risks (e.g. machine downtime, production of transition product and the risk of paper breakage) to produce a product other than that being presently manufactured since the setup costs will reduce the profitability of filling the order. However, other manufacturers will be seeking to minimize inventory, as well, and it is generally the case that an acceptance of an order will require that manufacturing time be scheduled on a particular machine, preferably in combination with other orders for the same grade and quality of material.

Unfortunately, filling order by purchase of inventory from another manufacturer is generally the limit of current practices and carries its own business risks. For example, the purchasing manufacturer will be less able to assure product quality and that the product will meet the expected specifications. Further, a customer discovering that an order has been filled from the inventory of another manufacturer may seek to place further orders directly with that manufacturer. Purchase from another manufacturers inventory also involves additional costs such as in transportation, relabelling and the like.

The process of filling orders from another manufacturer's inventory has also been cumbersome and difficult to carry out within the response time for accepting or rejecting an order since a sufficient quantity of the product must be located and terms for its sale negotiated between manufacturers, generally by a sequence of telephone calls. However, in recent years, communication of inventory information over computer network links between manufacturers has become more common and has expedited the process substantially.

Nevertheless, trading from existing inventory of manufacturers remains an incomplete solution to realizing substantially full economy in manufacturing since the availability of a sufficient quantity of goods at a suitable cost is not guaranteed, the process is cumbersome and protracted and, at best, presents unavoidable business risks while generally compromising economy and profitability at least to the extent of the economic cost of maintaining inventory against the potential costs and risks of additional transitions for machine set-up, manufacture of transitional product and the like, as discussed above. Further, while it may be possible to communicate inventory information easily and in a timely manner over computer network links, there has been no arrangement for presenting numerous scenarios from order and inventory information to a decision maker in order to support business decisions, especially those which may involve concerns such as customer service and satisfaction which may not be easily quantifiable or represented in anecdotal information or the judgment of the decision maker.

However, the inventors have recognized that further economies could be potentially derived from trading of future manufacturing capacity rather than simply purchasing from existing inventories. Unfortunately, the evaluation of prices consistent with scheduling across a plurality of manufacturers adds even more complexity to the problem of determining conditions and terms under which trading of manufacturing capacity would be mutually beneficial among two or more manufacturers.

Specifically, another manufacturer's excess manufacturing capacity may even be more economically exploited if the production of the order cannot be readily or efficiently combined and scheduled with other orders on the available production resources of the manufacturer receiving the order. In any such case, the trading of manufacturing capacity between manufacturers would generally tend to increase the efficiency with which both manufacturers can conduct their respective manufacturing operations while satisfying the requirements of their respective customers. However, while the existence of inventory can generally be readily determined and other costs such as labelling, transportation and potential overhead costs can be estimated, it is considerably less apparent whether any given manufacturer has suitable excess manufacturing capacity for a product meeting order specifications or whether or not it would be advantageous to make the product or, for that matter, how the economic advantages, if any, will compare among orders that are evaluated.

The question of whether to accept, reject or trade manufacturing capacity is, by nature, a very complex question of multiple objective optimization of the allocation and scheduling of machine manufacturing capacity, customer satisfaction and economic advantage within the terms, conditions and specifications of existing orders and/or those which can be anticipated with a suitable degree of confidence. Additionally, some of the objectives can be analyzed quantitatively while others should accommodate preferences such as some degree of flexibility in delivery dates, manufacturing overruns and underruns and the like. Quantitative evaluation may also obscure contingent information which may not be accommodated by the evaluation rules.

The question of whether manufacturing capacity exists raises the additional issues of delay of delivery dates for other products (and whether any delay will be tolerable for the customer) and whether the product specified in a particular order can be manufactured by the delivery date specified in the order, given the required setup time and the possibility of machine down-time during the manufacture of transitional product (e.g. paper breaks). Conversely, the terms of a particular order may be of sufficient economic advantage to cause acceptance of an order which requires trading for manufacturing capacity already scheduled for a machine in regard to an order which is of comparatively lesser economic advantage.

The evaluation of economic advantage in filling a particular order also requires consideration of the setup cost and risk against the potential profitability to be expected from meeting the demand. Further, beyond setup costs and risk, the production of product to meet demand (which may involve a combination of orders for the same product) may involve excessive production inefficiency. For example, an order may involve specifications (e.g. paper roll widths) which cannot be met without unacceptable waste if produced on an available machine, even when combined with other orders. Additionally, the cost of transportation from the manufacturing site to the required delivery location must be considered in evaluation of economic advantage, especially if manufacturing capacity is traded with another manufacturer having a manufacturing site remote from the delivery location.

Another complication in attempting to achieve economies across a plurality of manufacturers is that each manufacturer is likely to favor a different and potentially custom form of computer-supported decision making (e.g. a simple inventory database) if, indeed, any is used at all in the absence of available decision support systems useful for filling orders from stock manufactured materials. In general, each manufacturer will have relatively unique approaches to profitable business practices and a system which attempts to obtain economies over a plurality of manufacturers having different approaches to the conduct of their respective businesses is not likely to be accepted by all or even a majority of potential trading partners.

Currently, there is no facility whereby manufacturers can offer excess present demand or excess future manufacturing capacity to each other to facilitate trading thereof. Similarly, there is currently no facility or decision support system available for evaluating the economic advantage and manufacturing capacity for evaluation of an order, particularly in combination with a facility for offering excess demand or capacity, to determine whether an order should be rejected, accepted and/or traded, in whole or in part and the terms upon which trades can be offered to achieve some increase of efficiency and economic advantage among parties to a trade or purchase of manufacturing capacity.

In summary, no arrangement has been available which is able to function as a decision support system to present a plurality of different scenarios for filling a combination of customer orders for goods meeting particular specification from stock materials in inventory, much less including consideration of in-house production capacity or the inventory and/or production capacity of other manufacturers or allowing marketing of inventory and uncommitted production capacity to other manufacturers. It can also be appreciated that no system is currently available which permits efficient exploitation of network distribution of inventory and manufacturing capacity among manufacturers to facilitate business decisions which potentially increase manufacturing efficiency across a plurality of manufacturers for their mutual benefit while permitting independence of action and/or evaluation methodology in responding to such information. Further, no decision support system has been available which allows solutions to be developed which are based on arbitrary combinations of the above types of inventory and manufacturing capacity information.

SUMMARY OF THE INVENTION

It is therefore an object of the present invention to provide a decision support system for recommending allocation of resources to orders (e.g. for commodities) in regard to manufacturing capacity and inventory of the user and/or other potential suppliers.

It is another object of the invention to provide a decision support system for evaluating potential trades or purchases of manufacturing capacity relative to orders.

It is a further object of the invention to provide a decision support system for identifying candidate trades or purchases of inventory and/or manufacturing capacity and projecting respective effects on machine schedules of such candidate trades or purchases of manufacturing capacity.

In order to accomplish these and other objects of the invention, a decision support system and computer implemented method is provided, wherein the computer includes a source of demand information, and a source of plurality of categories of resource information, wherein one category of resource information is performance capacity, wherein the method and system perform or include means for performing the steps of storing and selectively accessing a plurality of solution generators, associating a portion of the demand information and a portion of the resource information with particular solution generators to allocate at least one category of resource information to correspond to demand information to form a solution, evaluating each solution, and communicating evaluations corresponding to a group of solutions generated by respective solution generators to a user.

The invention, so constituted, provides systematic processing that assists a person to make intelligent decisions when filling orders from inventory and manufacturing capacity as well as trading orders and manufacturing capacity with other manufacturers; considering a large number of possible trades and evaluating the desirability of each according to user-definable quantitative criteria to display the best alternatives and their evaluations for ease of comparison by the user. The invention evaluates different possible courses of action such as filling an order from existing inventory, trading the order or a portion thereof with a trade partner, producing the order in the future when manufacturing capacity is available, delaying other orders in an existing schedule and producing the order immediately to meet a due date, and the like. It should also be understood that trading an order or portion of an order is, in some ways, similar to purchasing manufacturing capacity but differs principally in the disposition of the product. That is, when manufacturing capacity is purchased the product is generally shipped to the purchasing manufacturer to be shipped to the customer as if made by the purchasing manufacturer whereas, if the order is traded, the product will generally be shipped directly to the customer.

Each of these alternatives has implications for customer satisfaction, operational efficiency and profitability for each manufacturer which are explored by the invention. When a candidate action includes an offer to another manufacturer, the invention calculates the improvement in an existing production schedule which would result from removing an order or partial order from the production schedule along with other customizable evaluations. When a candidate action involves acceptance of an order or a portion of an order, the invention calculates the impact of adding an order to the existing schedule.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is an exemplary presentation of a summary of effects of numerous possible solutions to a combination of orders and evaluations thereof, FIG. 4 is an exemplary presentation of actions required to implement a particular solution included in the presentation of FIG. 3, and FIG. 5 is an exemplary presentation of a production schedule reflecting actions included in the presentation of FIG. 4.

DETAILED DESCRIPTION OF A PREFERRED EMBODIMENT OF THE INVENTION

Figure 1:
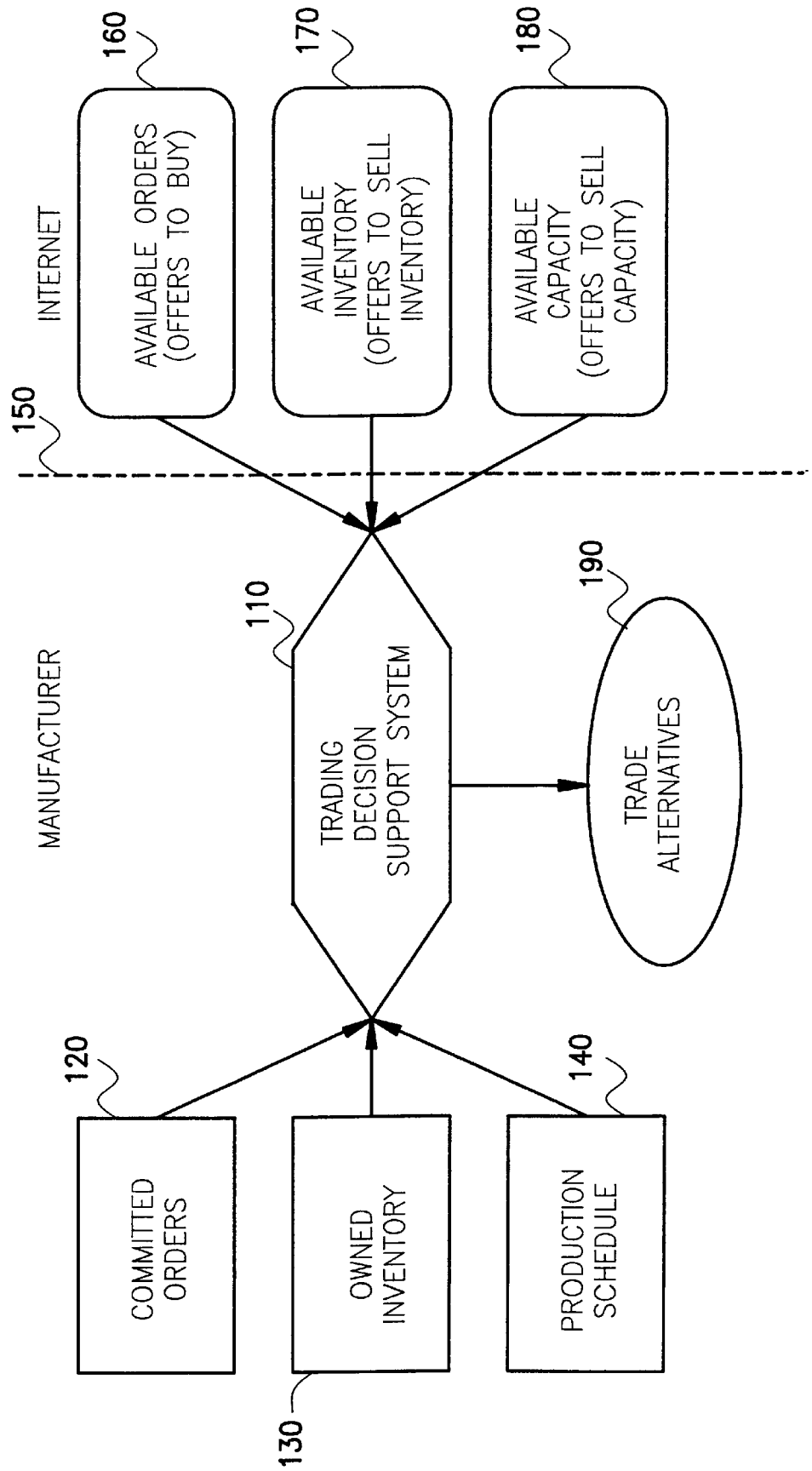
FIG. 1 is a high-level block diagram of the architecture of the system of the invention.

Referring now to the drawings, and more particularly to FIG. 1, there is shown a high-level block diagram/data flow diagram useful in understanding the environment of the invention and the applicability of the invention thereto to provide a decision support system for filling customer orders from a manufacturer's inventory and/or manufacturing capacity and/or the inventory and manufacturing capacity of other manufacturers. It should be understood that the illustration of FIG. 1 represents the system as seen by any individual user of the system. Further, it should be understood that while FIG. 1 bears some resemblance to the architecture of any connection to a network having plural sources of data that can be accessed from a local processor, no portion of FIG. 1 or any other Figure is admitted to be prior art in regard to the present invention.

More specifically, the portion of FIG. 1 to the left of dashed line 150, as depicted therein, corresponds to the processor local to any particular user and includes databases 120, 130 and 140 for committed (e.g. accepted) orders, owned (e.g. existing) inventory and production schedule of that user as it may exist at any given time. While these databases are depicted separately in the interest of clarity, the actual articulation of storage and the management of the particular databases is not at all important to the practice of the invention. That is, the databases corresponding to different categories of information concerning the status of the user's facility could all be stored in a common memory, included in a single database structure and commonly managed, if desired, without any effects on or alteration of the principles of the invention. The separate depiction in FIG. 1 is principally for the purpose of emphasizing that the trading decision support system 110 in accordance with any desired optimization, evaluation and/or search algorithm being executed can access any or all of these groups of data or categories of information in any desired combination in accordance with a preferred form of the invention.

By the same token, it should be appreciated that the search, optimization and/or evaluation algorithms used in the trading decision support system 110 for any particular user are preferably locally implemented on a processor local to the user. Therefore, in accordance with an important aspect of the invention, each user may freely implement any desired known or custom algorithms independently of any other user and the system in accordance with the invention does not require the sharing of such algorithms across a plurality of potential trading partners. However, it should be understood that the principles of the invention are also applicable to a shared decision support service accessible in its entirety to a plurality of users.

To the right side of dashed line 150 are three collective information sources 160, 170 and 180 which include available offers (e.g. offers to buy), available (e.g. existing) inventory and available capacity, respectively, functionally corresponding to local databases 120, 130 and 140, noted above but reflecting information from other manufacturers in regard to their inventory, production capacity and excess orders. However, since this data is provided by other manufacturers, provision of a translation utility may be required and inclusion of such a utility is preferred. Each of these collective data sources is a distributed resource comprising the shared portions of databases 120–140 (e.g. unprotected or available portions thereof) belonging to other manufacturers and which other manufacturers can freely edit, as will be discussed below.

Essentially, the categories of information which are made available is data which individual manufacturers are willing to share in order to discover potential economies which may be realized by cooperation between trading partners. The data made available will thus correspond to a listing of the offers, inventory and capacity which respective manufacturers are willing to sell or trade and does not require disclosure of all orders, inventory or capacity which may, in fact, be available. In other words, access to the entirety of information any given manufacturer may possess is not required in the practice of the invention. While it is anticipated that greatest economic advantage could be obtained if all available information is shared, the sharing of all information may not be considered by a user to be consistent with other business concerns such as quality control, customer satisfaction and the like.

Thus, it is seen that the invention is a decision support system which can assist individual trading partners in deciding to utilize their own inventory and performance capacity and potentially the inventory and/or performance capacity of others to fill orders while making orders which would otherwise be refused available to other manufacturers. That is, at any given time, a manufacturer will generally have a set of orders for supplying an amount of a product having given specifications. To do so the manufacturer may choose to apply existing inventory, apply production capacity, purchase inventory of another manufacturer or purchase and apply the production capacity of other manufacturers singly or in any combination. Additionally, any given manufacturer may wish to offer existing inventory and/or production capacity for sale to another manufacturer. The trading of excess orders can also be considered as a particular form of trading capacity but initiated from the standpoint of the potential supplier of the production capacity rather than the manufacturer offering to trade the order.

The decision support system in accordance with the invention preferably has the capacity to selectively consider any or all of these alternatives, as will be discussed in greater detail below, and to seek optimal solutions (e.g. actions that may be advantageously taken) based upon constraints and objectives specific to that enterprise. The invention thus provides an interface between an arbitrary combination of decision support subsystems, each using search, optimization and/or evaluation algorithms which may be arbitrarily and independently chosen by each user and which, in a preferred form of the invention, are individually unique to each user. The system in accordance with the invention thus provides the capacity to inform the user (e.g. 190 of FIG. 1) with a set of good alternative solutions for satisfaction of the set of orders, each of which is responsive to different tradeoffs between various possible objectives. Each of the solutions describes a set of actions to take.

As a perfecting feature of the invention, the system further analyzes and projects the effects of these actions on current schedules, allows modification of the actions proposed in any particular proposed solution with corresponding projection of effects of any solution so modified. That is, the system in accordance with the invention preferably provides for the projection of an action or set of actions included in each individual solution of the set of solutions and user-specified modifications thereof onto existing schedules and inventory (of the user, other manufacturers or both) by well-understood allocation algorithms so that the user can examine the solution in detail.

For example, assuming a set of alternative solutions includes (for extreme simplicity) two mutually exclusive actions of manufacturing goods to fill an order and (assuming the user has no available inventory corresponding to the order) filling the order from the inventory of another manufacturer. If the goods are manufactured to fill the order, production of goods to fill other orders may be delayed. Comparison of the solution which proposes filling of the order by manufacture with the other solution of the set which provides for filling the order by the purchase of inventory of another manufacturer will allow an evaluation of the cost of delivering other orders without the delay that would be incurred by adding the order to the manufacturing schedule.

Figure 2:
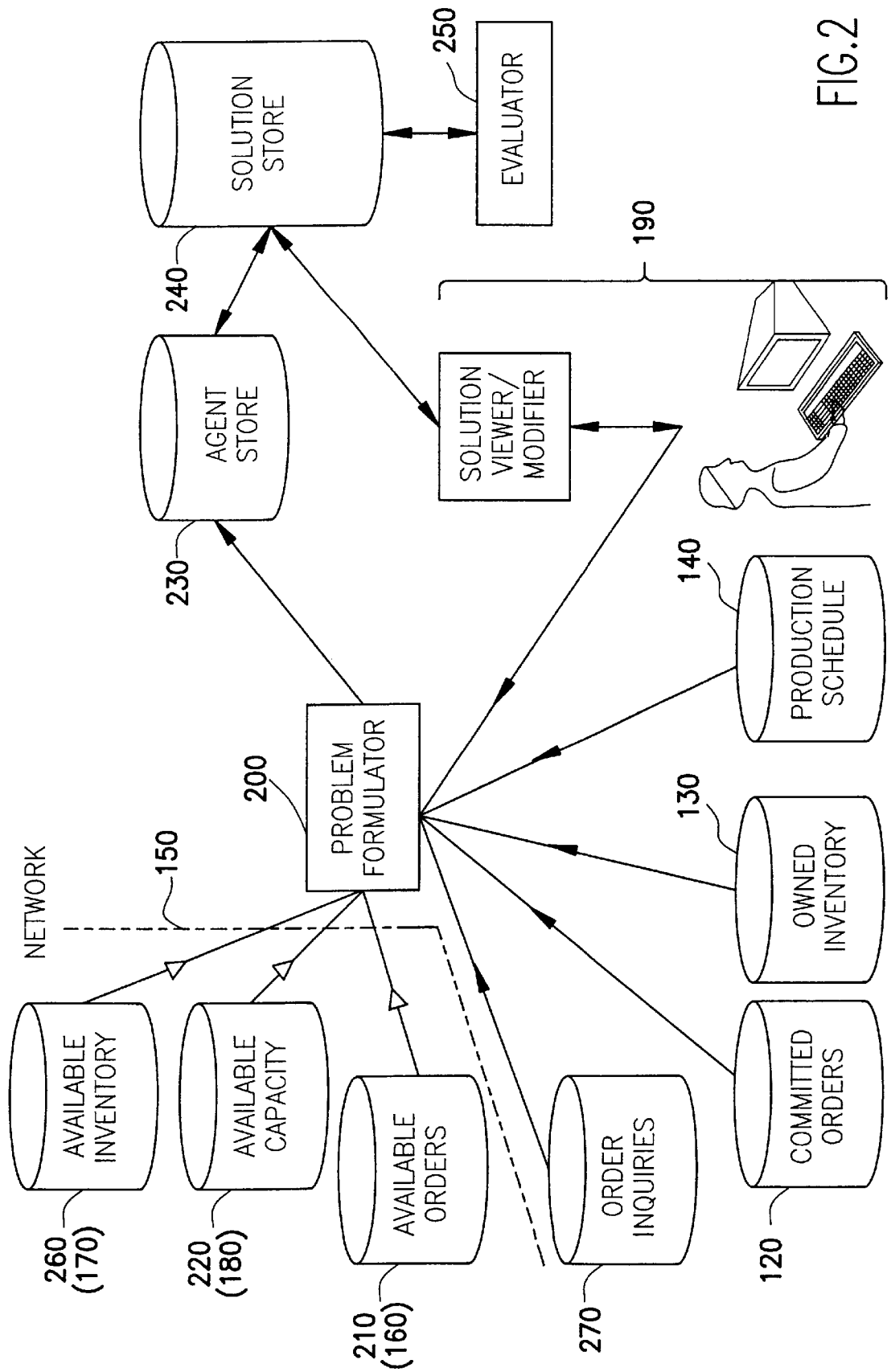
FIG. 2 is a block diagram of a preferred embodiment of the architecture of the invention.

Specifically, and with reference now to FIG. 2, the problem formulator 200, agent/algorithm store 230 and solution store 240 should be recognized as central to the decision support system of FIG. 1. Order database 120, inventory database 130 and production schedule database 140 are as shown in FIG. 1. These databases store current information concerning accepted orders to which the manufacturer has committed, existing inventory and production machine time scheduled to date. Database 270 contains order inquiries received (by any communication media, including a computer network) and which are to be evaluated by the invention.

In addition, the orders available database 210 (160 in FIG. 1) contains the specifications and quantities of product (or services) contained in orders received and made available from other manufacturers/providers (as indicated by dashed line 150). The available production or performance capacity (or other necessary resources) of other manufacturers by which the orders may be filled is stored in available capacity database 220 (180 of FIG. 1). Inventory available from other manufacturers is contained in database 260 (170 in FIG. 1) These seven databases thus contain the information by which a problem is formulated: how to allocate the available resources to satisfy as many of the current orders as possible while considering existing accepted orders, inventory and production schedule of the user and/or other manufacturers/suppliers for allocation to additional order inquiries.

As indicated above, the particular search, evaluation and/or optimization algorithm or algorithms used is not critical to the practice of the invention. The algorithms are schematically indicated as being contained in the agent store 230 from which they will be provided to the processor of the decision support system 110 (FIG. 1) to derive solutions to the problem. Suitable algorithms may include but are not limited to matching algorithms such as that described in U.S. patent application Ser. No. 09/047,215, filed Mar. 24, 1998, (Attorney's Docket No. Y09-97-433), those available in several commercially available software products such as R/3 sold by SAP of Walldorf, Germany. Other suitable algorithms can include various heuristics, such as the "rounding" heuristic and which are based on the mathematical programming formulation of the problem. Some custom algorithms may be particularly advantageous for particular applications of the invention such as that described in concurrently filed U.S. patent application Ser. No. 09/080, 320, (Attorney's Docket YO998-005) for developing paper roll size patterns which minimize waste. The application of these algorithms and others which may be hereafter found suitable will be evident to those skilled in the art.

Problem formulator 200 functions essentially to parse selected data into formats which correspond to particular selected algorithms retrieved from agent store 230. The selection of data for processing by the algorithms is preferably by database (e.g. 120, 130, 140, 210, 220, 260) and by manufacturer for resources of other manufacturers in order to consider different combinations of sources of inventory and resources. By applying the algorithms from agent store 230 to data from respective ones and combinations of these categories of data (represented by the depicted databases), different courses of action can be considered and a near-optimal solution for each course of action developed by the invention containing detailed actions and projected effects thereof for presentation to the user. The combinations of categories of data considered both reflect different courses of action and trade-offs of interest to the user.

As possible solutions are derived by the agent algorithms, they are stored at solution store 240 and evaluated by various criteria stored in and applied by the evaluator 250. Evaluator 250 is provided to impose constraints upon the solutions to validate or invalidate them and to apply some relatively arbitrary but objective evaluation function to the solutions which are validated. While the evaluation functions are not critical to the practice of the invention and will be evident to those skilled in the art, the evaluation process can be conceptualized as applying different combinations of weights to components of the solution which reflect tradeoffs of interest, which will be described below, and to develop relative objective valuations of the proposed solutions so that only the most favorable (e.g. economically) will be presented to the user.

This function and feature of the invention allows the user to then choose among the most favorable proposed solutions based on the tradeoffs as reflected in the projected results of carrying out particular actions (e.g. quantitatively detailed courses of action, such as buying or selling particular amounts of inventory, excess orders and/or excess production capacity). In much the same manner, when a combination of actions is considered in a solution (e.g. considering both owned inventory and inventory which may be purchased) combinations of relative weights can be applied which reflect, for example, the relative economy of using the manufacturers own inventory or capacity and the relative additional costs (e.g. labelling, transportation and the like including business risks) which may be incurred when inventory or production capacity is purchased.

By the same token, the use of the same or similar algorithms for deriving solutions for decision support systems in regard to different actions which can be taken based on different data which can be considered greatly simplifies the operation of the invention and adapts the respective algorithms to different actions and combinations of actions by the derivation of evaluation values based upon the particular tradeoffs which are considered. Therefore, the decision support system in accordance with the invention is extremely flexible and readily adaptable to virtually any commercial endeavor and the business priorities of the user.

More specifically and by way of example of an application of the invention to manufacturing of a commodity which, as in the case of paper-making as discussed above, requires allocation of resources representing substantial capital costs and involves stock materials which may require rework prior to delivery to a customer in response to an order, the decision support sub-system for applying inventory to orders preferably develops solutions in the form of a plurality of alternative plans showing the implications of applying different sub-sets of inventory items to different sub-sets of orders and reflect different tradeoffs between objectives such as avoidance of waste during rework (e.g. trim efficiency), maintaining inventory to satisfy anticipated or urgent orders, delay in filling of other orders, and the like.

Similarly, the decision support sub-system for assigning available capacity to orders creates a set of alternative plans each favoring different objectives and combinations of objectives such as delay in filling orders, relative profitability between orders and the like to reflect tradeoffs between them. Several types of algorithms are particularly well-suited for assigning production capacity to orders such as simple algorithms which search uncommitted production schedule times for matches for orders or groups of orders. Somewhat more complex algorithms can preferably explore modification of existing production schedules. Preferably, both are used so that the solutions derived can be compared.

The decision support sub-systems for purchase of the inventory or production capacity of other manufacturers preferably does the same but includes such factors as purchase price, commissions, relabelling and packaging costs, transportation to the customer or to a manufacturing site for rework, quality control and effects of shipping and rework on delivery time. Further, both of these latter sub-systems preferably consider purchase of inventory and/or production capacity from combinations of other manufacturers and reflect the implications of proportioning purchases between them.

The decision support sub-systems for offering inventory or production capacity for sale or trade function similarly to develop a set of alternative plans and indicate tradeoffs between objectives which may include maximization of revenue, minimization of depreciation and machinery set-up costs, maximization of warehouse and machinery utilization efficiency and minimization of transportation costs. These sub-systems are basically counterparts of the sub-systems which seek solutions for application of owned inventory and production capacity and principally operate on orders for which an acceptable solution is not found.

Based on the evaluation by evaluator 250 of solutions developed by the sub-systems applied singly or in combination, valid solutions which also satisfy arbitrary constraints are stored, together with an identifier and quantitative evaluation results in solution store 240 from which they may be retrieved at the will of the user, such as by calling for display of a report. An exemplary report format is shown in FIG. 3 in which column 310 displays the identifier for each solution and the report may be limited to only a relatively small number of solutions, as shown, either by definition of the report (e.g. each solution being the best solution in regard to a particular objective or combination of objectives) or selected iteratively by the operator viewing each solution in turn and discarding solutions which are not as desirable to the user as other solutions already examined. For example, solution 12 may be retained since, while it involves a maximum value of tardiness and number of tons which would be delivered late (columns 320 and 330), the number of orders which would be made late (column 340) and transportation costs (column 370) are next to least among the solutions presented while profit (column 350) is next to greatest and manufacturing cost (column 360) and quality risk (column 380) values are best among the solutions. The inventory (column 390) value is also minimum among the solutions presented which may or may not be favorable in view of current inventory levels.

The resulting list thus represents a set of solutions which are either automatically or manually selected from among solutions developed by the invention and which individually represent the results of particular tradeoffs between identified objectives. For example, profit would be maximized for solution 15 but would carry the potential disadvantages of highest purchased inventory, quality risk and late delivery in terms of both amount of goods and the number of orders, any of which may not be considered tolerable. In any event, the user may select a solution from the displayed list (e.g. by iteratively discarding less favorable solutions) to determine a course of action which, as a perfecting feature of the invention, may be communicated to managers and other personnel charged with implementing the decision as well as accomplishing the actual trading of orders, inventory and performance capacity with trading partners.

It should be understood that the list of solutions presented as shown, for example, in FIG. 3 reflect the projected effects of actions which are not necessarily, but could potentially be, included therein if deemed desirable. However, it is generally considered that a presentation of the projected effects is likely to be of primary importance to the user. Nevertheless, it should be understood that the details of the actions, themselves, are developed as solutions by the algorithms provided from agent store 230, whether or not those actions are detailed in a presentation of the projected effects derived therefrom.

Accordingly, as a perfecting feature of the invention, it is considered preferable to provide a capability for a user to modify a particular solution (e.g. group of detailed actions) which may be developed by the invention. To do so, a solution can be selected for modification in any known or suitable manner (e.g. by cursor and mouse manipulation, keyboard entry, voice recognition or the like) from the list presented in the manner of FIG. 3. A presentation of the underlying actions as depicted in a preferable exemplary form in FIG. 4 can be provided in any known manner by selection for modification (as distinct from selection for acceptance, as discussed above). This presentation is preferably editable in a manner which is well-understood in the art. From this presentation, the user can manipulate the details of the various actions (preferably under supervision of real-time error checking) such as moving quantities of purchased inventory from one supplier to another to provide a modified solution which may be somewhat less quantitatively optimal as would be determined by evaluator 250 but may reflect some important business concerns. When the editing is completed, the user may obtain an evaluation of the modified solution and its projected effects (e.g. by selecting the "re-evaluate" option 410 which may be presented to the user. This evaluation may, of course, be presented as a further solution in the format of, for example, FIG. 3.

It should also be understood that the actions specified by the solution or a modification thereof may be presented at plural nested levels. For example, as depicted in FIG. 5, a schedule for a particular machine is presented, for example, in response to a menu item 420 of FIG. 4. FIG. 5 illustrates the scheduled portion of machine time which is allocated to products specified in a column of FIG. 4. Hence, increasing the amount of purchased inventory for product 441, if possible, could result in removal of the portion of machine time scheduled for its production as depicted in FIG. 5, resulting in avoidance of a manufacturing transition and the acceleration of production and, possibly, delivery of additional product corresponding to code 435. Other depictions of details of other actions or projected conditions (e.g. unallocated inventory) could be presented to a user for evaluation in a similar manner. Thus different effects of solutions and modified solutions produced and the projected effects of actions specified thereby can be considered in detail by a user prior to acceptance of a particular course of action in the manner discussed above.

In view of the foregoing, it is seen that the invention provides a relatively simple interface for a plurality of similarly implemented decision support sub-systems to collect information over a computer network or any other communication medium or combination thereof and provide alternative solutions which allow a decision-maker/user to compare the implications of solutions in regard to a plurality of objectives and a plurality of possible actions and combinations of actions. The system also allows potential efficiencies and economies to be realized across a plurality of business concerns such as manufacturers while allowing each potential trading partner utilizing the system to have complete independence in choice of criteria, constraints and priorities in regard to their own decision-making process and algorithms supporting the same.

While the invention has been described in terms of a single preferred embodiment, those skilled in the art will recognize that the invention can be practiced with modification within the spirit and scope of the appended claims.

Having thus described my invention, what i claim as new and desire to secure by letters patent is as follows:

1. A decision support system comprising
   a source of demand information,
   a source of plurality of categories of resource information, wherein one category of resource information is performance capacity,
   means for storing and selectively accessing a plurality of solution generators,
   means for associating a portion of said demand information and a portion of said resource information with ones of said plurality of solution generators whereby ones of said solution generators allocate at least one category of resource information to correspond to said demand information to form a solution,
   means for evaluating each said solution, and
   means for communicating evaluations corresponding to a group of solutions generated by respective ones of said solution generators to a user.

2. A decision support system as recited in claim 1, further including
   means for modifying a selected solution to form a modified solution,
   means for evaluating said modified solution, and
   means for communicating evaluations corresponding to a group of solutions generated by respective ones of said solution generators and said modified solution to a user.

3. A decision support system as recited in claim 1, wherein said performance capacity is a performance capacity of a user.

4. A decision support system as recited in claim 1, wherein said categories of resource information includes the production schedule of said user and a said solution generator allocates performance capacity of said user to order inquiries.

5. A decision support system as recited in claim 1, wherein said categories of resource information includes inventory of another provider and a said solution generator allocates inventory of said another provider to order inquiries.

6. A decision support system as recited in claim 1, wherein said categories of resource information includes performance capacity of another provider and a said solution generator allocates performance capacity of said another provider to order inquiries.

7. A decision support system as recited in claim 1, wherein said categories of resource information includes available orders of another provider and a said solution generator allocates performance capacity of said user to said available orders.

8. A decision support system as recited in claim 7, further including means for communicating acceptance of a portion of a said available order by said user to said another provider.

9. A decision support system as recited in claim 1, wherein at least one of said resource information and said demand information includes a corresponding at least one of resource information and demand information of another provider.

10. A computer implemented method, wherein said computer includes a source of demand information, and a source of plurality of categories of resource information, wherein one category of resource information is performance capacity, said method comprising the steps of
    storing and selectively accessing a plurality of solution generators,
    associating a portion of said demand information and a portion of said resource information with ones of said plurality of solution generators whereby ones of said solution generators allocate at least one category of resource information to correspond to said demand information to form a solution,
    evaluating each said solution, and
    communicating evaluations corresponding to a group of solutions generated by respective ones of said solution generators to a user.

11. A method as recited in claim 10, further including the step of
    modifying a selected solution to form a modified solution,
    evaluating said modified solution, and
    communicating evaluations corresponding to a group of solutions generated by respective ones of said solution generators and said modified solution to a user.

12. A method as recited in claim 10, wherein said performance capacity is a performance capacity of a user.

13. A method as recited in claim 10, wherein said categories of resource information includes the production schedule of said user and a said solution generator allocates performance capacity of said user to order inquiries.

14. A method as recited in claim 10, wherein said categories of resource information includes inventory of another provider and a said solution generator allocates inventory of said another provider to order inquiries.

15. A method as recited in claim 10, wherein said categories of resource information includes performance capacity of another provider and a said solution generator allocates performance capacity of said another provider to order inquiries.

16. A method as recited in claim 10, wherein said categories of resource information includes available orders of another provider and a said solution generator allocates performance capacity of said user to said available orders.

17. A method as recited in claim 16, further including the step of
    communicating acceptance of a portion of a said available order by said user to said another provider.

18. A method as recited in claim 10, wherein at least one of said resource information and said demand information includes a corresponding at least one of resource information and demand information of another provider.

* * * * *